(12) United States Patent
Temler et al.

(10) Patent No.: US 7,413,088 B2
(45) Date of Patent: Aug. 19, 2008

(54) AUTOMATIC CONVEYOR SLOT CLOSURE

(75) Inventors: Jan S. Temler, Spanish Fort, AL (US);
Rusty Willmore, Prattville, AL (US);
Willie Lee, Prattville, AL (US)

(73) Assignee: International Paper Company, Memphis, TN (US)

( * ) Notice: Subject to any disclaimer, the term of this patent is extended or adjusted under 35 U.S.C. 154(b) by 448 days.

(21) Appl. No.: 10/772,710

(22) Filed: Feb. 5, 2004

(65) Prior Publication Data

US 2005/0173858 A1 Aug. 11, 2005

(51) Int. Cl.
*B07C 5/14* (2006.01)
(52) U.S. Cl. ............................ 209/521; 209/620
(58) Field of Classification Search ............ 198/494, 198/493, 600; 209/518, 521, 656, 657, 707, 209/620, 625, 384, 385, 387, 517; 241/24.29, 241/28, 32, 68; 83/162, 166, 446, 906
See application file for complete search history.

(56) References Cited

U.S. PATENT DOCUMENTS

| | | | | |
|---|---|---|---|---|
| 2,624,444 A | * | 1/1953 | Casabona | 198/560 |
| 3,621,997 A | | 11/1971 | Hobbs | |
| 3,853,212 A | * | 12/1974 | Downes | 198/572 |
| 3,941,235 A | * | 3/1976 | Pierret et al. | 198/600 |
| 4,199,066 A | * | 4/1980 | Horzer et al. | 209/626 |
| 4,884,700 A | | 12/1989 | Allgauer et al. | |
| 4,955,484 A | * | 9/1990 | Rintala et al. | 209/599 |
| 5,082,118 A | * | 1/1992 | Rintala et al. | 209/599 |
| 6,371,304 B2 | * | 4/2002 | Gambini | 209/620 |

FOREIGN PATENT DOCUMENTS

| DE | 3718-208 A | 5/1987 |
|---|---|---|
| WO | WO 96/22176 | 7/1996 |

\* cited by examiner

*Primary Examiner*—Patrick Mackey
*Assistant Examiner*—Mark Beauchaine
(74) *Attorney, Agent, or Firm*—Matthew M. Eslami

(57) ABSTRACT

Apparatus for self-clearing of clogs developed between adjacent ends of upstream and downstream conveyors adapted to carry products thereon in the course of transfer of the products past a gap defined between the conveyors. The apparatus comprises a shield disposed between the adjacent ends of the conveyors and adapted to cover less than all of the gap between the conveyors and having a proximal side edge disposed adjacent the end of the downstream conveyor, thereby defining an opening for the discharge of debris from the products being transferred between the conveyors through the opening. The shield is mounted for selected degrees of covering relationship to the gap between the conveyors. Means is provided for biasing the shield toward a position of maximal covering of the gap while permitting automatic movement of the shield toward a position of reduced covering of the gap as a function of the application of a force against said shield occasioned by the initiation of a clog by the products being transferred between the shield and the downstream conveyor.

3 Claims, 4 Drawing Sheets

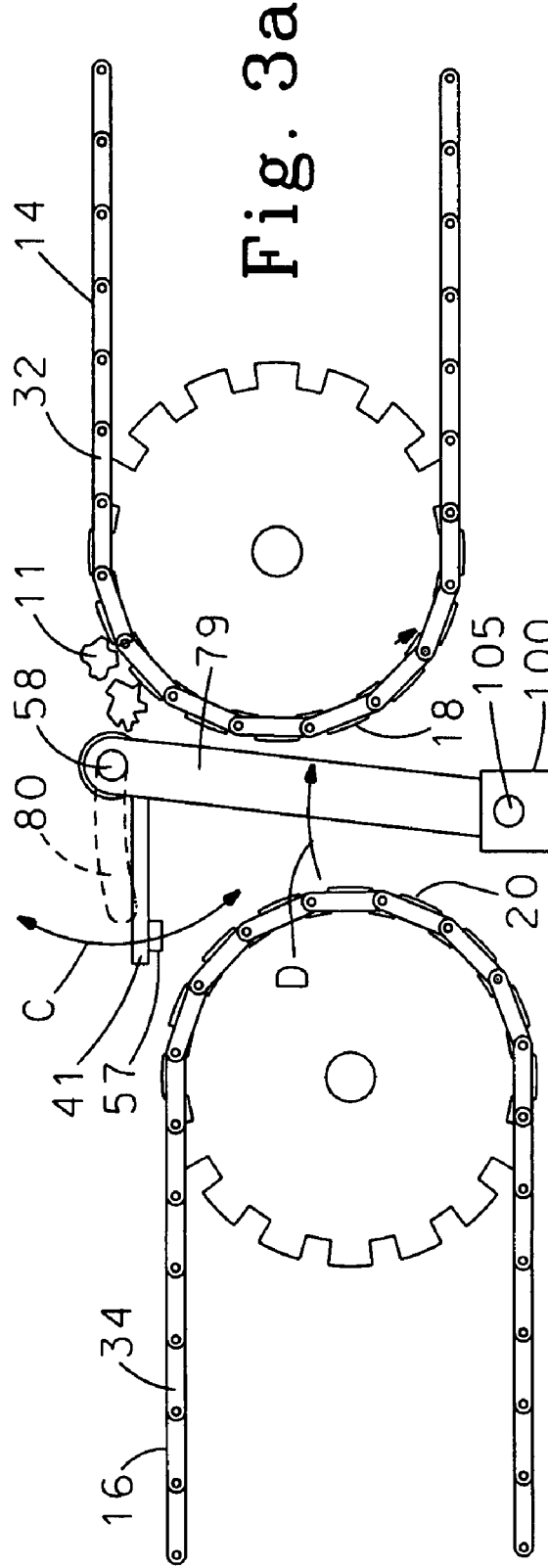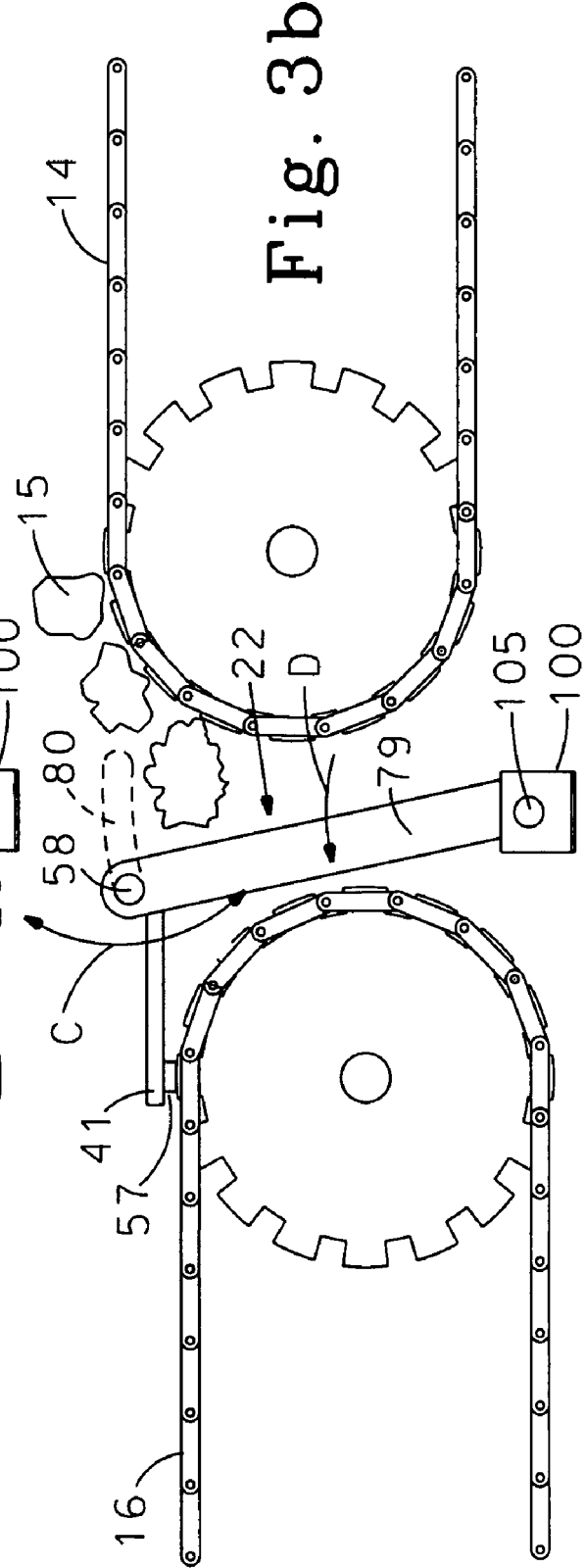

AUTOMATIC CONVEYOR SLOT CLOSURE

CROSS-REFERENCE TO RELATED APPLICATIONS

Not Applicable

STATEMENT REGARDING FEDERALLY SPONSORED RESEARCH OR DEVELOPMENT

Not Applicable

FIELD OF INVENTION

This invention relates to conveyors, and particularly to devices employed to selectively bridge the gap between contiguous ends of two conveyors or conveyor sections.

BACKGROUND OF INVENTION

In the manufacture of paper from wood, among the first steps are debarking the logs and conversion of the wood logs into chips which are subsequently cooked (digested) to commence the separation of the wood fibers from other components of the chips.

In a common sequence of operation, the logs are loaded with a crane from a storage yard to a debarking drum where at least a major portion of the bark is removed from each log and thereafter the debarked logs are discharged onto the conveying system to a chipper. This conveying operation to the chipper is commonly designed to spread the logs into loose bundles of two or three parallel aligned logs. These bundles are loaded onto a conveyor, one bundle behind another bundle, so that the bundles are fed consecutively to the chipper, thereby ensuring a smooth and continuous flow of logs into the chipper such that the chipper is efficiently utilized but does not become clogged. A clogged chipper commonly is shut down when a clog develops, with attendant loss of operating time and the cost of maintenance required to clear the clog.

Usually two chain conveyors, or occasionally belt conveyors, are employed in conveying the bundles of logs to a chipper. These two conveyors are directionally aligned with one another, the upstream end of the downstream conveyor terminating short of the downstream end of the upstream conveyor, thereby developing an open gap between these adjacent conveyor ends. The use of two conveyors permits, among other things, the development of a gap between the contiguous ends of the conveyors through which trash, such as pieces of bark, too small pieces of wood, and/or other undesirable materials to fall by gravity through the gap and be collected or transported to a remote site, to be used as fuel, for example.

In a log conveying system, a gap between conveyor ends may range from about 3 inches to about 10 inches in length (measured in the direction of movement of the conveyors) and will extend fully across the width of the conveyors.

As noted, the gap between the conveyor ends is desirable from the standpoint of allowing debris, mainly pieces of bark and occasionally some wood pieces, to be separated from the logs as they are moved to the chipper. However, the open gap between the adjacent ends of the two conveyors permits chunks of useable wood or even small or short logs to fall into the gap, rather than being transferred from the downstream to the upstream conveyor. These small or short logs in the gap tend to cause other debris to collect within the gap, resulting in the development of a clog within the gap. Such clogs commonly develop into a size and degree of compaction within the gap as to either overload one of both of the conveyor motors, stopping the conveyor(s) or to physically damage one or both of the conveyors, especially when employing the commonly used chain conveyors. Even if the clog does not halt the movement of the conveyors, it disrupts the desired even flow of logs to the chipper and/or can even cause dislodgement of one or more logs from the conveyor, among other possible disastrous results.

In certain mills which process smaller diameter logs, the loss of useful wood via the gap is exasperated, thus creating a problem in accommodating the desired functioning of the gap as a remover of debris while permitting usable wood pieces to be conveyed across the gap and into the chipper. Mere adjustment of the width of the gap between the conveyor ends is not feasible in that such requires movement of the conveyors toward or away from one another, a major time-consuming and costly operation.

Placing a shield within the gap to lessen the width of the gap also is unworkable in that mere reduction of the width of the gap increases the likelihood of a clog developing. One approach to this problem has been to install a fast driven roller within the gap with the intent that relatively larger pieces of wood will be propelled across the gap, while bark and smaller pieces of wood will merely fall through the gap. In one embodiment, this roller is mounted for vertical movement within the gap, but not permitted to move different lateral distances at each of its opposite ends. Thus, a piece of wood, for example, which is larger that the fixed open space defined between the roller and a conveyor end, can clog the gap. That is, there is no flexibility of lateral movement of the fixed roller, only up and down movement of the roller. In certain mills, the character of the bark debris changes with the season, for example, longer (stringy) bark strings may be present when processing Spring wood. During such times, it is desirable to have a wider gap to permit such debris to pass through the gap, rather than being conveyed to the chipper and without clogging developing within the gap.

SUMMARY OF INVENTION

In accordance with one aspect of the present invention, there is provided a shield, such as a solid metal plate, mounted within the gap between contiguous ends of two conveyors in a manner which permits the plane of the shield to normally be oriented substantially parallel to the tops of adjacent conveyor ends. That side edge of the shield adjacent the end of the downstream conveyor is pivotably mounted on a shaft which extends fully across the width of the conveyor superstructure and is spaced from the end of the downstream conveyor by a distance sufficient to define a gap of limited width between the shaft-mounted side edge of the shield and the end of the downstream conveyor. The opposite and outboard side edge of the shield is disposed adjacent the end of the upstream conveyor. The shield thus normally extends in cantilevered fashion, but rotatable about the shaft, across at least a selected portion of the gap thereby closing that portion of the gap disposed between the shaft and the outboard side edge of the shield. The outboard side edge of the shield is supported in cantilevered fashion in overlying, spaced apart, relationship to the top of the end of the upstream conveyor so that at all times the shield closes substantially all of the gap between the location of the shaft and the end of the upstream conveyor.

Recalling that the shaft, hence the shield, is mounted for hinged movement, spring or like means is provided to bias the shaft to an initial position spaced apart by a selected distance from the end of the downstream conveyor to develop an initial opening between the end of the downstream conveyor and the shaft (and the shield), debris and undesirably sized wood pieces fall through such initial opening to be collected or carried away. Further hinged movement of the shaft either toward or away from the end of the downstream conveyor is physically limited. Upon the initiation of a clog in this initial opening, the shaft and its accompanying side edge of the shield is urged by the clog into the open space between the conveyor ends thereby opening up a relatively larger gap between the shaft and its accompanying side edge of the shield and the end of the downstream conveyor, thereby permitting the passage of the clogging debris through the wider opening. The debris passing through the wider opening clears the clog and the debris is carried away to a collection location. Upon clearing of the clog the biasing means associated with the shaft (the springs), urge the shaft and the shield toward their original orientation with respect to the tops of the conveyors and minimization of the gap width, thereby permitting the shield to return to its position of limiting the width of the gap.

In accordance with one aspect of the present invention, the invention comprises an assembly which includes the shield and means for hinged mounting of the shield within the confines of the gap. In one embodiment, the opposite side corners of the proximal side edge of the shield (adjacent the downstream conveyor) are each provided with a mounting bracket. These brackets are rigidly affixed to their respective corners of the shield and each defines a bore through the thickness thereof. The bores of the two corner brackets are in register and a rigid shaft having its opposite ends threaded, is removably disposed within the bores with its opposite ends projecting from the opposite sides of the shield to be received within guide slots defined in the existing superstructure of the conveyors. These brackets, hence the shield itself, are rotatable relative to the shaft. In one embodiment, a roller is mounted on the shaft in the space between the corner brackets and extends across substantially the full length of the shield. This roller serves, in part, to protect against clogging of the relatively small gap between the discharge end of the downstream conveyor.

Further, in this embodiment, the shield is provided with elongated mounting links. One end of each link is hinged to a portion of the superstructure of the conveyor on a respective side of the conveyor. The distal end of each link is bored to rotatably receive one end of the shaft therein, so that the shaft, hence the shield, is mounted for hinged movement laterally within the gap.

In this embodiment, the opposite ends of the shaft which project laterally from the shield are slidably retained within respective curved slots also defined in the superstructure of the conveyor. In the depicted embodiment, the hinged movement of the shaft and shield toward a maximum opening of the gap is alternatively or further limited as by small steel blocks that are welded to the superstructure of the conveyor, in the path of the arms holding the shaft serving to limit the extent of hinged movement of the shaft and shield between a defined maximum opening of the gap and a minimum opening of the gap.

As noted, spring means or other suitable biasing means, are provided to bias the hinged movement of the shield such that the shield is at all times urged toward its position of minimum gap opening (its closed position).

Clogs normally develop between the proximal side edge of the shield and the end of the downstream conveyor. Such clogs produce a vectoral pressure directed slightly downward and laterally into the gap. This pressure against the shaft and the proximal side edge of the shield which is sufficient to overcome the bias force of the springs, thereby causing the shield to move forwardly (toward the upstream conveyor) into the open space defined by the gap with the outboard side edge of the shield remaining cantilevered above the end of the upstream conveyor. This action opens up a larger opening between the end of the downstream conveyor and the shaft and shield such that the clog passes through such openng and is conveyed away to a remote location. Upon clearing of a clog, the shaft and shield return to their orientation of general parallelism with respect to the tops of the conveyors until a further clog develops.

BRIEF DESCRIPTION OF FIGURES

FIG. 3a is a representation depicting one embodiment of the apparatus of the present invention in position for the passage of debris only through the gap;

FIG. 3b is a perspective view as in FIG. 3a and depicting the passage of a clog past one embodiment of the present invention disposed in an open position relative to the gap; and, FIG. 4 is a schematic exploded view of apparatus of the present invention.

DETAILED DESCRIPTION OF INVENTION

Figure 1:
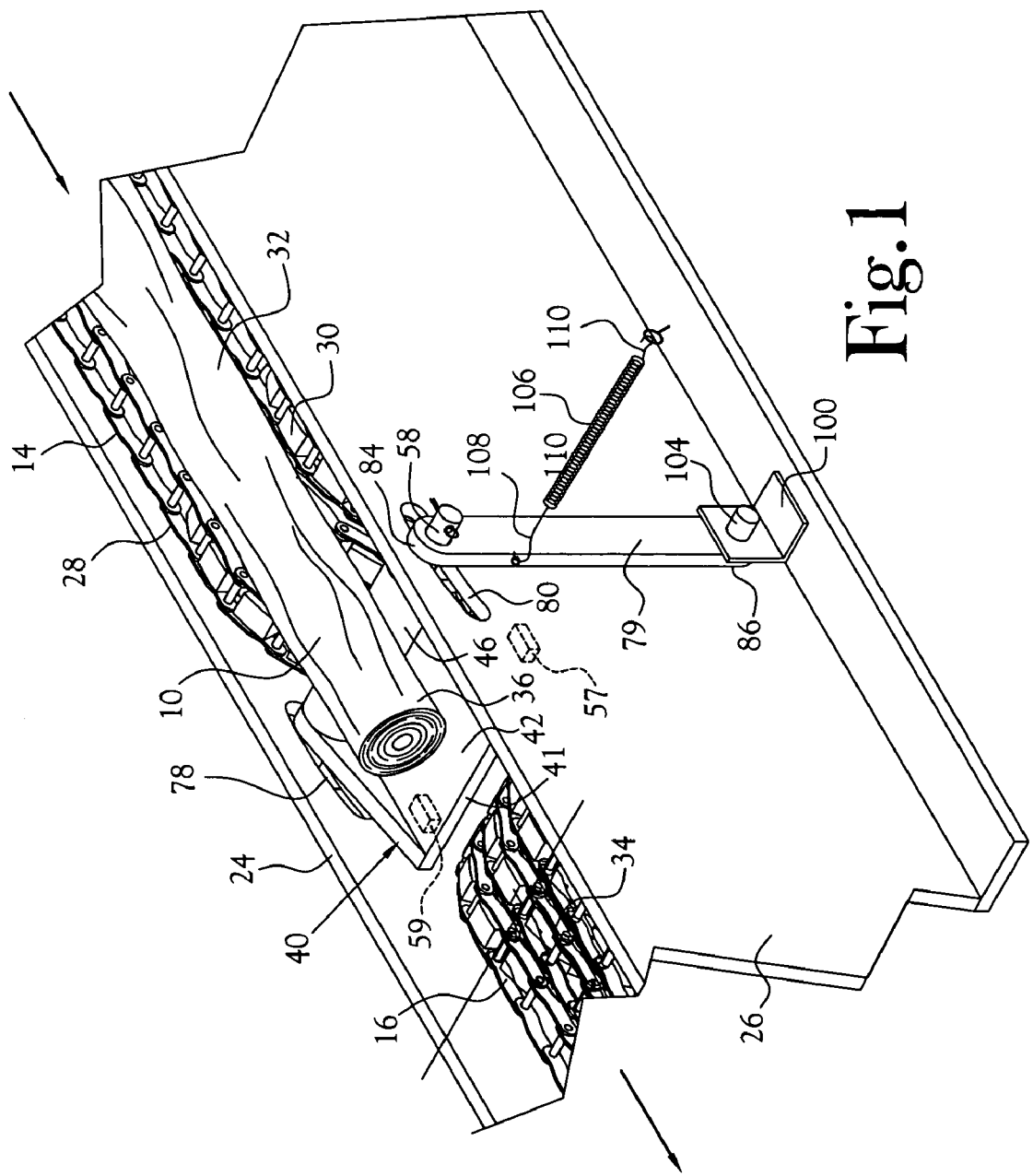
FIG. 1 is a perspective view of one embodiment of the present invention disposed with the gap depicted in FIG. 2.
Figure 2:
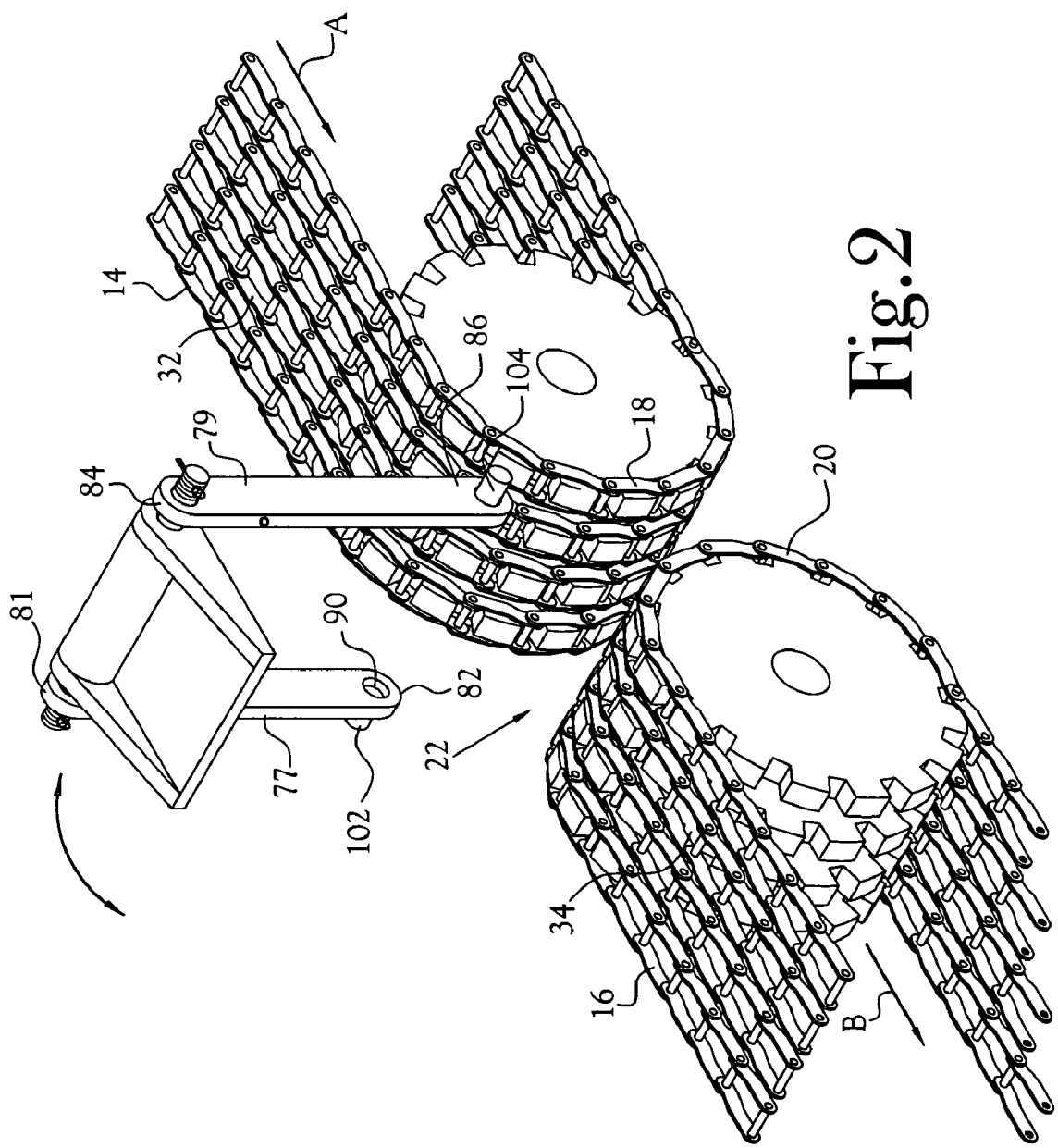
FIG. 2 is a schematic representation of adjacent ends of two conveyors and depicting a gap therebetween and one embodiment of an assembly of the present invention in position to be mounted within the gap.

Referring initially to FIGS. 1 and 2, in a typical mill for converting wood logs to chips, the debarked logs 10 (typical) are discharged by gravity from the debarking drum (not shown) onto a first conveyor 14 and conveyed toward a chipper (not shown). Shortly before reaching the chipper, the logs are transferred from the first conveyor to a second conveyor 16 which completes the transfer of the logs to the chipper. As depicted in FIG. 2, the end 18 of the first conveyor terminates short of, but adjacent to, the end 20 of the second conveyor. These ends of the conveyors are spaced apart and define an open gap 22 therebetween which extends substantially fully across the width of the conveyors. As seen in FIG. 1, the conveyors are supported by superstructure which typically includes first and second support beams 24,26 disposed along opposite sides 28,30 of the conveyors and spaced apart by a distance sufficient to receive the conveyors therebetween. Typically, the gap between the conveyor ends is between about 3 and about 10 inches in width, as measured in the direction of movement of the conveyors as indicated by the arrows A and B of FIG. 2. Frequently, for ease of transfer of logs from the first to the second conveyor, the top 32 of the first conveyor is disposed at a slightly higher horizontal level than the top 34 of the second conveyor, thereby facilitating the ready engagement of a leading end 36 of a log with the top 34 of the second conveyor after such leading end of the log has passed the gap.

Figure 4:
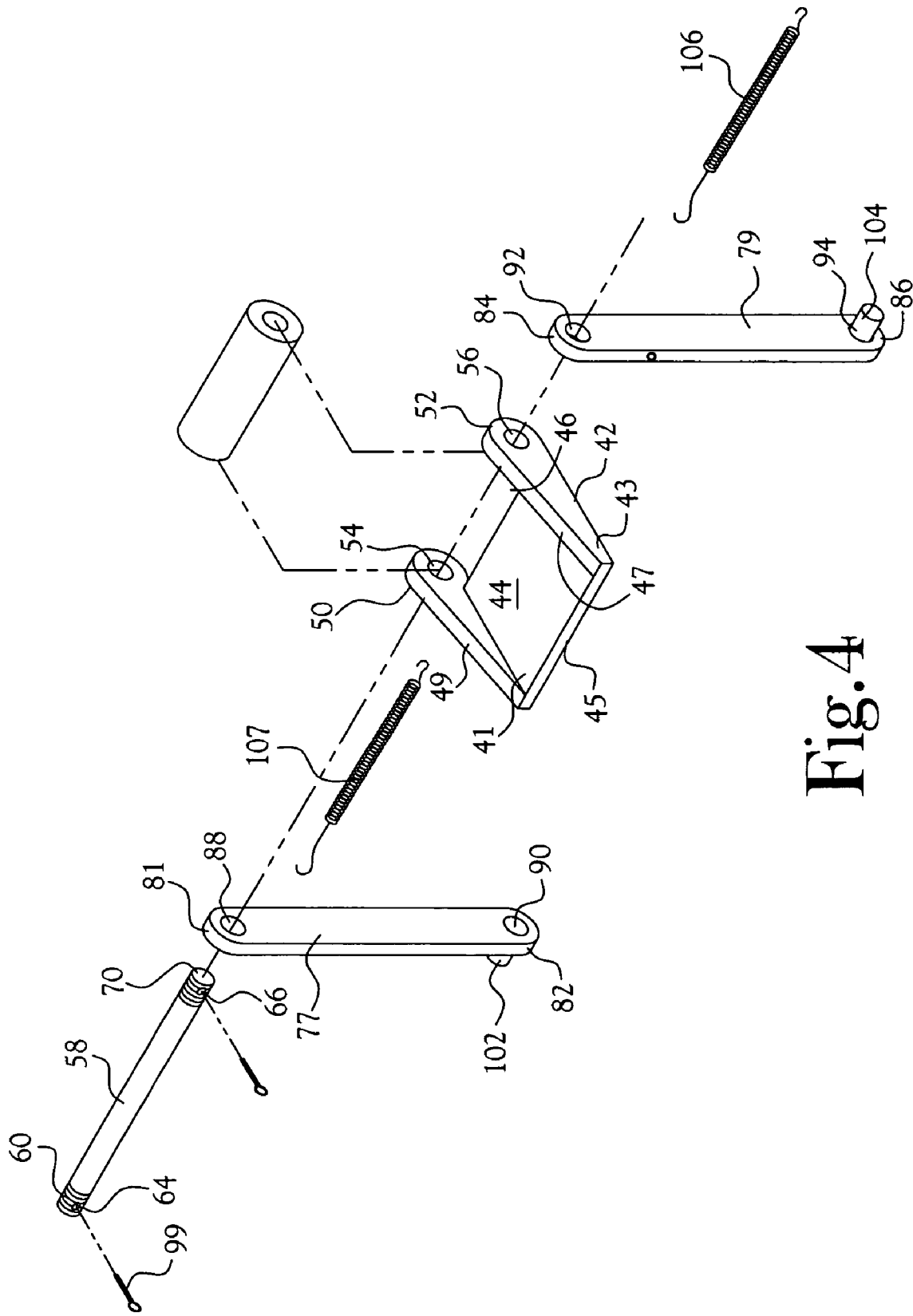

Referring specifically to FIG. 1, in one embodiment, the present invention comprises an assembly 40 which includes a shield 42, such as a solid rigid metal plate, chosen of a size which substantially spans the gap between the ends of two conveyors by a desired extent. As seen in FIG. 4, the depicted shield is of rectangular geometry having planar top and bottom surfaces 44 and 45, and optional side walls 47 and 49. The shield extends substantially fully between the opposite sides of the conveyor superstructure, i.e., between the support beams 24,26 for the conveyors. The width dimension of the shield is chosen to cause one of side edges 46 of the shield to be disposed proximate, but spaced apart from the end 18 of the first conveyor by a distance which is selected to provide a limited opening (gap) 22 between the side edge 46 of the shield and the end 20 of the upstream conveyor 16. This opening is chosen to permit the free passage of debris, but not useful chunks of wood or small logs, through such opening to be collected and carried away, as desired.

Typically, there is provided a gap of about 1.5 inches defined between the proximal side edge 46 of the shield and the end 18 of the first (downstream) conveyor 14 when the shield is disposed in it's "non-open" position relative to the end 18 of the first conveyor. In any event, this gap is chosen to be of sufficient width as to permit the free passage therethrough of debris only and to preclude the passage therethrough of useful wood pieces, chunks, short logs or other geometries of useful wood.

As depicted in FIGS. 1 and 4, the shield 42 is provided with corner mounting brackets 50,52 on opposite corners of the proximal side edge 46 and the opposite ends 41 and 43 of the shield. Each bracket includes a bore 54,56 respectively, extending through the bracket, with the bores of the two corner brackets being in register. A rigid shaft 58 having external threads 60,62 and/or bores 64,66 provided on its opposite ends 68,70, respectively, is freely rotatably received within the bores 54,56 of the shield mounting brackets 50,52 with the opposite ends 68,70 of the shaft projecting from their respective shield mounting brackets to be received in respective curved slots 78,80 defined in the support beams 24,26 for the conveyors. The shield is thus freely rotatable about the shaft 58 as indicated by the arrow C in FIG. 3a. Alternatively or additionally, small steel blocks 57 and 59 are welded to the superstructure, to not allow the shield to flip over the downstream chain (and avoid thus potential damage). When the assembly 40 is mounted in position within the gap 22, the shield projects in cantilevered fashion from its proximal side edge 46 across the gap 22 with its opposite, and distal, side edge 41 terminating in cantilevered fashion in overlying, spaced apart, relationship to the top surface 74 of the second (upstream) conveyor.

In one embodiment, transfer of logs and other non-debris conveyed material from the downstream conveyor to the upstream conveyor across the gap 22 is aided by means of a roller 82 which is mounted on the shaft 58 and which extends along the proximal side edge 46 of the shield between the shield mounting bracket 50 and 51. This roller is freely rotatable about the shaft 58 and enhances the movement of useful wood pieces onto and across the shield and also serves to protect against clogging of the opening between the discharge end of the downstream conveyor and the proximal side edge of the shield. Alternatively, the roller may be omitted and a rounded geometry of the proximal side edge of the shield may be employed, but with less efficiency of function.

Further, and referring still to FIG. 1, the assembly includes first and second rigid links 77,79 having respective first and second ends 81,82 and 84,86. Each of the first and second ends of each link is provided with a throughbore 88,90,92 and 94 respectively. Within the throughbores 88,92 on the first ends 81,84 of the links, there are rotatably received the threaded ends 68 and 70, respectively, of the shaft 58, the ends of the shaft being provided with means such as nuts 96 (typical), to retain the link ends on the shaft ends. Optionally, cotter pins 98 (typical), or the like may be provided in throughbores 64,68 in the threaded ends of the shaft, in lieu of nuts, to retain the joiner of the links and the shaft. Each link extends from the shaft downwardly alongside respective ones of the opposite side rails 24,26 of the superstructure for the conveyors and is anchored to a respective side rail as by respective hinge brackets 100 (only one mounting bracket is depicted). Each link terminates with its second end (end 86 of link 79 shown in FIG. 1) disposed adjacent a respective one of the first and second hinge brackets which are anchored to respective ones of the support beams for the conveyors. Hinge pins 102 and 104 are received through the throughbores 90,94 defined in the ends 82,86 of the links which are disposed in register with throughbores defined in the respective mounting brackets to define a hinge axis 105 for hinged movement of the shaft and its accompanying shield between its initially relatively closed "non-open" position and its relatively open position relative to the gap as shown by the arrow D.

As may be seen in FIG. 1, when the assembly is operatively disposed within the gap, the ends 68,70 of the shaft 58 are slidably received with respective ones of curved slots 78,80 defined in the support beams 24,26 for the conveyors and project therefrom to receive the links 77,79. Each such slot is of a curved geometry to accommodate hinged movement of the shield as will be described hereinafter. It may also define the maximum limits of such hinged movement of the shield. Specifically, one end 68,70 of each slot 64,66, respectively, defines the limit of hinged movement of the shield toward an open relationship with the gap and the opposite end 72,74 of each slot 64,66, respectively, defines the limit of hinged movement of the shield toward a relatively closed relationship within the gap. The curvature of each slot is a function of the distance between the slot and the hinge line for the shield and may assume any of a number of designs, depending upon the conveyors, their mountings, the desired maximum gap between the ends of the conveyors, the desired maximum movement of the shield, the desired vectoral direction of movement of the proximal side edge of the shield (and its mounting shaft), and other factors as will be recognized by one skilled in the art. As noted, alternatively or additionally, small metal blocks 57, 59 may be welded to the superstructure as a means for limiting the rotational movement of the shield toward a maximum opening of the gap. Further, the side walls 47, 49 serve to cover the slots 64, 66 against clogging of each slot by debris, etc., and to preclude the undesired escape of debris laterally outwardly of the superstructure.

As seen in FIG. 1, springs 106 and 107 are provided to bias the links, hence the shaft and its accompanying shield, toward a relatively closed position of the shield relative to the gap, i.e., biased toward minimum desired separation between the proximal side edge 46 of first conveyor. To this end, one of the ends 108 of each spring is anchored to a respective one of the links at a location near the connection of the link to the shield. The opposite ends 110 of each spring is anchored to a respective one of the support beams of the conveyors, or other suitable location.

Notably, the assembly 40 of the present invention is unitary to the extent that upon withdrawal of the shaft 58 from the bores of the corner brackets on the proximal side edge of the shield and from the slots 78,80, withdrawal of the hinge pins 102,104 and disconnection of the springs 100, the assembly may readily be fully removed from its position within the gap 22, between the conveyor ends, as needed or desired. This feature permits the ready substitution of a different sized shield (with its mountings) when faced with the conveyance of a different type of logs, juvenile trees, for example.

When the conveyors are running and logs 10 plus debris 11 (FIG. 3a) are being conveyed toward the chipper, the logs readily move from the downstream conveyor, across the roller, across the top planar surface of the shield, thence onto the upstream conveyor and are carried to the chipper without material interruption. Debris exiting the end of the downstream conveyor falls, by gravity, through that relatively small opening defined between the proximal side edge of the shield (the roller) and the discharge end of the downstream conveyor.

Preferably, the proximal side edge of the shield 46 is disposed immediately adjacent the discharge end of the downstream conveyor, but with a minimal opening of between about 1 inches and about 2.5 inches therebetween. This size opening accommodates the passage of most debris through the gap. If a clog 15, for example, engages the roller or proximal side edge of the shield and is caught between the roller or shield and the chain of the downstream conveyor, as depicted in FIG. 3b, the shield rotates about its hinge axis 105 and opens up a larger opening between the discharge end of the downstream conveyor and the proximal side edge of the shield, thereby allowing the clog to pass through and be conveyed away to a remote location. Moreover, should a chain element of a conveyor strike the roller or the shield, the roller and the shield will pivot about the hinge axis of the assembly, allowing the offending chain element to pass without destructive damage to either the conveyor or the assembly.

The distal side edge 41 of the shield "floats" just above the surface 34 of the upstream conveyor at all times, thereby eliminating any likelihood of a clog between the shield and the upstream conveyor. This floating feature permits the shield to rotate about the axis of the shaft 58 as the shaft is translated laterally within the gap, either toward or away from the downstream conveyor, thereby maintaining the desired extent of closure of substantially all of the gap between the shaft and the end of the upstream conveyor.

The automatic functioning of the shield assembly opens up a larger gap between the proximal side edge of the shield and the discharge end of the downstream conveyor to permit a clog to clear itself by allowing the passage through the larger opening of the larger pieces of debris or wood which is generating the clog. By reason of the hinged moveability of the shield, oncoming debris may pass through the opening defined between the proximal side edge of the shield and the discharge end of the downstream conveyor without creating a clog. When and if a clog commences to form, the hinged movement of the shield permits the clog to attempt clearing of itself, without adding to the clog as it is attempting to clear itself. It is to be noted that this novel hinged movement of the shield within the gap is automatic in the sense that no movement of the shield away from the end of the first conveyor is commenced or effected other than by the force exerted against the proximal side edge of the shield by a clog, and when the clog clears itself, the shield automatically responds to the bias of the springs and returns to its normally relatively closed position relative to the gap. Selection of the magnitude of the force required to move the shield from its closed position toward an open position is permitted by selection of the resistance to shield movement offered by the springs as will be recognized by one skilled in the art.

Another feature of the present invention is the ability of the shield to move in a limited yaw direction to the limited extent of the length of the curved slots in the conveyor superstructure and in which the ends of the shaft 58 are slidably mounted. This feature permits one end of the shelf to move a limited distance to possibly free a clog of relatively small size without opening the gap fully across the width of the conveyor and thereby allowing desirable wood pieces to fall through the gap while the clog is being cleared.

Whereas the present invention has been described herein employing specific sizes, shapes or other parameters, it will be recognized by one skilled in the art that modifications may be made without deviating from the spirit of the invention which is intended to be limited only as set forth in the claims appended hereto. In particular, the concepts of the present invention are applicable to conveyors of many types, e.g., belt conveyors, chain conveyors, and to the transport of any of a very large variety of materials other than wood. Further, preferably the shield is of planar construction, e.g, of generally rectangular cross section, but other configurations of the shield may be employed. Further, the material of construction of the shield may be varied from metal to polymeric materials or combinations thereof. Still further, the mounting of the shield within the gap between the conveyor ends may take forms other than a rigid shaft, such as stub shafts projecting from opposite ends of the shield or other equivalent means for rotatably mounting of the shield along its proximal side edge for movement within the gap.

What is claimed is:

1. Apparatus for self-clearing of clogs developed between adjacent ends of downstream and upstream conveyors adapted to carry products thereon in the course of transfer of the products past a gap defined between the conveyors, comprising a shield disposed between the adjacent ends of the conveyors and configured to cover less than all of the gap between the conveyors and having a proximal side edge disposed adjacent the end of the upstream conveyor, thereby defining an opening for the discharge of debris associated with the products being transferred between the conveyors through said opening, means for mounting said shield for selected degrees of covering relationship to the gap between the conveyors, means for biasing said shield toward a position of maximum covering of the gap while permitting automatic movement of said shield toward a position of reduced covering of the gap as a function of the application of a force against said shield occasioned by the initiation of a clog by debris associated with the products being transferred between said shield and the upstream conveyor, wherein said means for mounting said shield comprises shaft means rotatably mounting said proximal side edge of said shield across the width of the gap, said width being measured substantially perpendicular to the forward direction of movement of the downstream conveyor; and hinge means for mounting said shaft means for hinged movement generally laterally between the adjacent ends of the conveyors and within the gap.

2. The apparatus of claim 1 and including means for biasing said hinge means to position said shield toward a position of maximum covering of the gap.

3. The apparatus of claim 1 and including means for receipt of opposite ends of said shaft for guiding and limiting the permissible hinged movement of said shield.

* * * * *